(12) United States Patent
Yonezawa

(10) Patent No.: US 11,139,696 B2
(45) Date of Patent: Oct. 5, 2021

(54) WIRELESS POWER SUPPLY DEVICE

(71) Applicant: SMK Corporation, Tokyo (JP)

(72) Inventor: Satoshi Yonezawa, Saitama (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 17/105,542

(22) Filed: Nov. 26, 2020

(65) Prior Publication Data

US 2021/0281117 A1    Sep. 9, 2021

(30) Foreign Application Priority Data

Mar. 6, 2020  (JP) ............................. JP2020-038812

(51) Int. Cl.
*H02J 50/23* (2016.01)
*H02J 50/27* (2016.01)
*H02J 50/70* (2016.01)
*H01Q 9/04* (2006.01)

(52) U.S. Cl.
CPC ............ *H02J 50/23* (2016.02); *H01Q 9/0421* (2013.01); *H02J 50/27* (2016.02); *H02J 50/70* (2016.02)

(58) Field of Classification Search
None
See application file for complete search history.

(56) References Cited

U.S. PATENT DOCUMENTS 10,263,468 B2 * 4/2019 Schmitz ............... H04B 5/0081
2011/0029156 A1   2/2011 Vernacchia 2013/0003820 A1   1/2013 Malhan
2016/0327444 A1 * 11/2016 Ichikawa ................. B62M 6/50
2018/0102211 A1 *  4/2018 Hanabusa ............... H01F 38/18

FOREIGN PATENT DOCUMENTS

| JP | 2014166788 A | 9/2014 |
| JP | 6129992 B2   | 5/2017 |
| JP | 2018207762 A | 12/2018 |

OTHER PUBLICATIONS

Extended European Search Report for European Patent Application No. 20212389.9, issued by the European Patent Office dated Jun. 10, 2021.

* cited by examiner

*Primary Examiner* — Jared Fureman
*Assistant Examiner* — Joel Barnett

(57) ABSTRACT

A wireless power supply device includes: a power transmitting antenna; a power supply circuit configured to supply a microwave to the power transmitting antenna; a power receiving antenna; a power receiving circuit configured to receive supply of power of the microwave via the power receiving antenna; a load configured to operate using the power supplied by the power receiving circuit; and an electrically-conductive case surrounded by an electrically-conductive plate in which the power transmitting antenna and the power receiving antenna are accommodated. In the electrically-conductive case, a microwave radiated from the power transmitting antenna is received by the power receiving antenna, and power of the microwave is supplied to the load from the power receiving circuit.

7 Claims, 5 Drawing Sheets

WIRELESS POWER SUPPLY DEVICE

CROSS REFERENCE TO RELATED APPLICATION

The contents of the following Japanese patent application are incorporated herein by reference,
Japanese Patent Application NO. 2020-038812 filed on Mar. 6, 2020.

FIELD

The present invention relates to a radio wave wireless power supply device that receives microwaves radiated from a power transmitting antenna by a power receiving antenna and supplies power to a load connected to the power receiving antenna.

BACKGROUND

As power supply methods for wirelessly supplying power to operate a load attached to a movable part, which is movable relative to a device main body, to the load from a power source in the device main body, an inductive coupling method in which a power transmitting coil attached to the device main body is inductively coupled with a power receiving coil attached to the movable part, and a magnetic resonance method in which a power transmitting coil and a power receiving coil are brought into magnetic resonance at the same frequency have been put into practical use.

A magnetic resonance wireless power supply device 100, described in Patent Literature 1, for wirelessly supplying power by magnetic resonance made between a power transmitting coil and a power receiving coil will be described below with reference to FIGS. 4 and 5. The wireless power supply device 100 is employed for supplying power to a torque sensor 111 attached to a crankshaft 102 (hereinafter, referred to as a movable part), which rotates together with a pedal relative to a main body (hereinafter, referred to as a fixed part) of a power-assisted bicycle, from the fixed part. In FIG. 4, the reference numeral 101 denotes a bottom bracket of the fixed part attached below a seat tube to which a battery is fixed. The bottom bracket 101 includes a bearing 101a through which the crankshaft 102 rotating together with the pedal is rotatably inserted.

This power-assisted bicycle estimates a running torque applied to the crankshaft 102 on the basis of a strain detected by the torque sensor 111 attached to the movable part. On the basis of the estimated running torque, the power-assisted bicycle compensates for the rotation of the crankshaft 102 by driving an electric motor in the fixed part. A power transmitting circuit board 120 fixed to the bottom bracket 101 of the fixed part by screws includes: a power transmitting LC circuit 103 in which a power transmitting coil 121 and a power transmitting capacitor 125 are connected in series; an AC power source 124 configured to output an AC voltage signal having a resonance frequency $f_0$ of the power transmitting LC circuit 103 on the basis of a clock signal generated by a CLK generating unit 123; a driver 127 configured to output the AC voltage signal to a voltage conversion coil 126 coupled with the power transmitting coil 121 by electromagnetic induction; and a demodulation circuit unit 122 configured to demodulate a detection value of the torque sensor 111 modulated by a load modulation circuit unit 113 in the movable part, for example.

A power receiving circuit board 110 attached to the movable part includes: a power receiving LC circuit 104 including a power receiving coil 112 and a power receiving capacitor 114 connected in series and having a resonance frequency $f_0$ the same as the resonance frequency $f_0$ of the power transmitting LC circuit 103; a power source circuit 115 connected to the power receiving LC circuit 104; the torque sensor 111; and the load modulation circuit unit 113 configured to output a detection value detected by the torque sensor 111 to the fixed part, for example.

The power receiving circuit board 110 has a disc shape and is fixed around a rotation axis of the crankshaft 102. The power transmitting circuit board 120 has a disc shape through which the crankshaft 102 is inserted, and is fixed to the bottom bracket 101 by screws so as to be opposed to the power receiving circuit board 110. With such a configuration, the power receiving coil 112 and the power transmitting coil 121 are arranged on opposed faces of the power receiving circuit board 110 and the power transmitting circuit board 120 so as to face each other at a distance of several centimeters away from each other around the axis of the crankshaft 102. Thus, the power receiving coil 112 and the power transmitting coil 121 have magnetic resonance with a relatively low energy loss.

In the fixed part, the AC voltage signal having the resonance frequency $f_0$ is outputted to the voltage conversion coil 126 by the driver 127, thereby exciting the power transmitting coil 121, being coupled with the voltage conversion coil 126 by electromagnetic induction, at the resonance frequency $f_0$. As the result, a magnetic field having the resonance frequency $f_0$ is generated around the power transmitting coil 121, and the power receiving coil 112 of the power receiving circuit board 110 having the same resonance frequency $f_0$ resonates in the magnetic field, thereby generating induced electromotive force across the power receiving coil 112. The induced electromotive force generated in the power receiving coil 112 is rectified, and then inputted to the power source circuit 115 as a DC voltage via a lowpass filter. In this manner, wireless power supply from the fixed part to the movable part is achieved. Using the inputted DC power source voltage, the power source circuit 115 of the movable part provides a driving power to circuit components mounted on the power receiving circuit board 110 as well as the torque sensor 111.

The load modulation circuit unit 113 in the movable part modulates a power source current flowing through the power receiving coil 112 by the generation of the induced electromotive force with detection data detected by the torque sensor 111. The load modulation circuit unit 113 then superimposes the modulated signal over the AC voltage signal flowing through the voltage conversion coil 126 via the power transmitting coil 121 of the fixed part resonating with the power receiving coil 112, and the voltage conversion coil 126 coupled with the power transmitting coil 121 by electromagnetic induction. The demodulation circuit unit 122 connected to the voltage conversion coil 126 demodulates the detection data from the modulated signal superimposed over the AC voltage signal, and outputs the demodulated detection data to a drive control circuit (not shown) that controls operations of the electric motor.

According to such a magnetic resonance wireless power supply device 100, a power source can be provided from the main body of the bicycle equipped with the battery, or the like, to the torque sensor 111 attached to the crankshaft, which rotates relative to the main body, using the wireless power supply technology so as to drive the torque sensor 111. The magnetic resonance wireless power supply device 100 can also output the detection data detected by the torque sensor 111 wirelessly to the drive control circuit in the main body of the bicycle.

As another wireless power supply method, a radio wave method in which a power receiving antenna receives radio waves radiated from a power transmitting antenna and power is supplied wirelessly to a load connected to the power receiving antenna is described in Patent Literature 2 or Patent Literature 3, for example.

CITATION LIST

Patent Literature

Patent Literature 1: Japanese Patent No. 6129992
Patent Literature 2: Japanese Patent Application Laid-Open No. 2014-166788
Patent Literature 3: Japanese Patent Application Laid-Open No. 2018-207762

SUMMARY

Technical Problem

According to the magnetic resonance method adapted in the wireless power supply device 100 described in Patent Literature 1, a distance between the power receiving coil 112 and the power transmitting coil 121 can be increased to several centimeters in contrast to several millimeters in the inductive coupling method. According to such a magnetic resonance method, however, since the power transmitting coil and the power receiving coil need to be resonated at the same resonance frequency $f_0$, it takes time and effort to adjust circuit constants of the power transmitting LC circuit 103 and the power receiving LC circuit 104.

In each of the magnetic resonance method and the inductive coupling method, substrates on which the power receiving coil and the power transmitting coil are mounted need to be disposed in an opposed manner, and loop antennas are used as the power receiving coil and the power transmitting coil in order to improve low transmission efficiency. Such a loop antenna, however, is required to have a size with a diameter of at least about 3 cm in order to wind wires, and it is therefore difficult to downsize a loop antenna to be smaller than such a size. Furthermore, high-density mounting is being demanded, and a build-up substrate having many layers needs to be used in order to form a coil having a loop pattern on a wiring substrate having a limited mounting area, thus resulting in a complicated structure and a high cost.

In a wireless power supply device of the radio wave method described, for example, in Patent Literature 2 or Patent Literature 3, in contrast, the size of the power transmitting antenna and the power receiving antenna is proportional to a wavelength of the used radio wave. Thus, if downsizing of such antennas is desired in consideration of the size of their installation space, the radio wave needs to have a frequency at or above a certain level, such as a microwave. A power density of radio waves radiated from the power transmitting antenna, on the other hand, decays with the square of the frequency of the radio waves transmitted to the power receiving antenna from the power transmitting antenna. Thus, a radio wave having a lower frequency needs to be used in order to obtain a received power sufficient to operate the load. That is, a trade-off relationship exists between the downsizing of the antennas, which requires increasing the frequency of the radio wave, and the acquisition of a sufficient received power, which requires decreasing the frequency of the radio wave.

Thus, if a power transmitting antenna and a power receiving antenna downsized using a microwave having a high frequency are used, microwaves having a high transmission power are radiated from the power transmitting antenna, but such antennas are at risk for adversely affecting the human body or unintentionally heating substances therearound. As such, wireless power supply via a 2.4 GHz microwave, for example, is prohibited at the time of filing the present application.

A power density of radio waves radiated from an isotropic power transmitting antenna to an open space decays inversely with the square of a distance from the power transmitting antenna. Thus, if the power transmitting antenna and the power receiving antenna are separated from each other by a certain distance, its transmission efficiency becomes deteriorated, thus failing to obtain, at the power receiving antenna, a received power sufficient to operate the load.

By using antennas having directivity, such as planar antennas, as the power transmitting antenna and the power receiving antenna, the transmission efficiency of wireless power supply can be improved. Such a planar antenna having directivity, however, has an increased size as a whole, and needs to be disposed parallel to a ground plane at a predetermined height. This requires a three-dimensional installation space, thus imposing limitations on the installation of the power transmitting antenna and the power receiving antenna.

The present invention has been made in view of the foregoing conventional problems, and it is an object of the present invention to provide a wireless power supply device capable of obtaining, at a power receiving antenna, a received power sufficient to operate a load even when antennas are downsized using a microwave having a high frequency.

It is another object of the present invention to provide a wireless power supply device capable of obtaining, at a power receiving antenna, a received power sufficient to operate a load even when antennas are downsized without using antennas having directivity as a power transmitting antenna and the power receiving antenna.

It is still another object of the present invention to provide a wireless power supply device capable of obtaining, at a power receiving antenna, a received power sufficient to operate a load even when a power transmitting antenna and the power receiving antenna are at a distance from each other.

It is still another object of the present invention to provide a wireless power supply device that is free from risk of adversely affecting the human body or unintentionally heating substances therearound even when microwaves having a transmission power at a level capable of obtaining, at a power receiving antenna, a received power sufficient to operate a load are radiated from a power transmitting antenna.

It is still another object of the present invention to provide a wireless power supply device avoiding the need to provide a three-dimensional antenna installation space by forming a power transmitting antenna or a power receiving antenna along a surface of a substrate.

Solution to Problem

In order to achieve the foregoing objects, a first aspect of the present invention provides a wireless power supply device including: a power transmitting antenna; a power supply circuit configured to supply a microwave to the power transmitting antenna; a power receiving antenna; a power receiving circuit configured to receive supply of power of the microwave via the power receiving antenna; a load configured to operate using the power supplied by the power receiving circuit; and an electrically-conductive case surrounded by an electrically-conductive plate in which the power transmitting antenna and the power receiving antenna are accommodated. In the electrically-conductive case, a microwave radiated from the power transmitting antenna is received by the power receiving antenna, and power of the microwave is supplied to the load from the power receiving circuit.

Since the microwave radiated from the power transmitting antenna is reflected inside the electrically-conductive case and received by the power receiving antenna, these antennas require no directivity. Thus, power is supplied at a high transmission efficiency.

No microwave radiated from the power transmitting antenna escapes from the electrically-conductive case.

According to a second aspect of the present invention, at least one of the power transmitting antenna and the power receiving antenna is configured as an inverted-F antenna including an elongated main body part, and a power supply line and a short circuit line connected to one side of the main body part in a longitudinal direction thereof so as to be perpendicular to the main body part.

Since the power transmitting antenna or the power receiving antenna requires no directivity, such an antenna can be configured as an inverted-F antenna having a length of adding the short circuit line to the main body part corresponding to λ/4 of the microwave.

According to a third aspect of the present invention, the inverted-F antenna serving as the power transmitting antenna, and a ground plane connected to the power supply line of the inverted-F antenna are integrally formed by a conductive pattern provided on a substrate surface of a power transmitting circuit board.

The inverted-F antenna serving as the power transmitting antenna, and the ground plane are formed by the conductive pattern on the substrate surface of the power transmitting circuit board.

According to a fourth aspect of the present invention, the inverted-F antenna serving as the power receiving antenna, and a ground plane connected to the power supply line of the inverted-F antenna are integrally formed by a conductive pattern provided on a substrate surface of a power receiving circuit board.

The inverted-F antenna serving as the power receiving antenna, and the ground plane are formed by the conductive pattern on the substrate surface of the power receiving circuit board.

A fifth aspect of the present invention provides a wireless power supply device including: a power transmitting circuit board on which a power transmitting antenna is formed; a power supply circuit configured to supply a microwave to the power transmitting antenna; a power receiving circuit board on which a power receiving antenna is formed; a power receiving circuit configured to receive supply of power of the microwave via the power receiving antenna; a load configured to operate using the power supplied by the power receiving circuit; and an electrically-conductive case surrounded by an electrically-conductive plate in which the power transmitting antenna and the power receiving antenna are accommodated. In the electrically-conductive case, a microwave radiated from the power transmitting antenna is received by the power receiving antenna, and power of the microwave is supplied to the load. The load is a torque sensor configured to detect a running torque of a crankshaft that rotates together with a pedal of a power-assisted bicycle. The torque sensor and the power receiving circuit board are fixed to the crankshaft. The power transmitting circuit board on which the power transmitting antenna is formed and the power receiving circuit board on which the power receiving antenna is formed are accommodated in the electrically-conductive case fixed to a main body of the power-assisted bicycle.

The power transmitting circuit board on which the power transmitting antenna is formed and the power receiving circuit board on which the power receiving antenna is formed are accommodated in the electrically-conductive case fixed to the main body of the power-assisted bicycle so as to be protected from external forces.

No microwave radiated from the power transmitting antenna inside the electrically-conductive case surrounded by the electrically-conductive plate escapes from the electrically-conductive case.

Since the microwave radiated from the power transmitting antenna is reflected inside the electrically-conductive case and received by the power receiving antenna, these antennas require no directivity. Thus, power is supplied at a high transmission efficiency.

According to a sixth aspect of the present invention, at least one of the power transmitting antenna and the power receiving antenna is configured as an inverted-F antenna including an elongated main body part, and a power supply line and a short circuit line connected to one side of the main body part in a longitudinal direction thereof so as to be perpendicular to the main body part. The inverted-F antenna and a ground plane connected to the short circuit line of the inverted-F antenna are integrally formed by a conductive pattern provided along a substrate surface of the power transmitting circuit board or the power receiving circuit board.

The inverted-F antenna serving as at least one of the power transmitting antenna and the power receiving antenna, and the ground plane are formed by the conductive pattern on the substrate surface of the power transmitting circuit board or the power receiving circuit board.

According to a seventh aspect of the present invention, the power receiving circuit board is formed in a disc shape to be fixed around an axis of the crankshaft. The main body part of the inverted-F antenna serving as the power receiving antenna is formed by an arc-shaped conductive pattern provided along an outer circumferential edge of the disc-shaped power receiving circuit board. The ground plane connected to the short circuit line of the inverted-F antenna serving as the power receiving antenna is formed by a fan-shaped conductive pattern provided along an inner circumferential edge of the disc-shaped power receiving circuit board.

Since the main body part of the inverted-F antenna is formed along the outer circumferential edge of the disc-shaped power receiving circuit board and the ground plane is formed along the inner circumferential edge thereof, the elongated main body part having a sufficient length and the ground plane along the main body part can be formed on one surface of the power receiving circuit board having a limited size.

According to the first aspect of the present invention, since no microwave radiated from the power transmitting antenna escapes from the electrically-conductive case, power can be wirelessly supplied to the load at a high transmission efficiency. Therefore, even when a microwave having a high frequency is used and the power transmitting antenna and the power receiving antenna are separated by a distance of about several centimeters, a received power sufficient to operate the load can be obtained at the power receiving antenna.

Moreover, since no high-energy microwave escapes from the electrically-conductive case, there are no noise effects on electronic circuits therearound, and little harmful effects on the human body.

Moreover, a level of power decay is low even when a microwave having a high frequency is used, and no directivity is required for radiation and reception of the microwave. Thus, both of the power transmitting antenna and the power receiving antenna can be configured as downsized antennas.

According to the second aspect of the present invention, at least one of the power transmitting antenna and the power receiving antenna can be configured as the inverted-F antenna corresponding to $\lambda/4$ of the microwave, thus achieving the downsizing of the antenna.

According to the third aspect of the present invention, the inverted-F antenna serving as the power transmitting antenna and the ground plane connected to the short circuit line of the inverted-F antenna can be formed in a step of providing printed wiring of the conductive pattern on the substrate surface of the power transmitting circuit board.

Moreover, since the power transmitting antenna and the ground plane can be formed planarly along the substrate surface of the power transmitting circuit board, there is no need to provide a three-dimensional installation space for the installation of the power transmitting antenna.

According to the fourth aspect of the present invention, the inverted-F antenna serving as the power receiving antenna and the ground plane connected to the short circuit line of the inverted-F antenna can be formed in a step of providing printed wiring of the conductive pattern on the substrate surface of the power receiving circuit board.

Moreover, since the power receiving antenna and the ground plane can be formed planarly along the substrate surface of the power receiving circuit board, there is no need to provide a three-dimensional installation space for the installation of the power receiving antenna.

According to the fifth aspect of the present invention, with the use of the electrically-conductive case fixed to the main body of the power-assisted bicycle for protecting the circuit components mounted on the power transmitting circuit board and the power receiving circuit board from the external forces, the microwave radiated from the power transmitting antenna can be shielded from the outside. As such, no high-energy microwave escapes from the electrically-conductive case, thus having little harmful effects on the human body riding on the power-assisted bicycle.

Since no microwave radiated from the power transmitting antenna escapes from the electrically-conductive case, power can be supplied to the torque sensor fixed to the crankshaft, which rotates together with the pedal of the power-assisted bicycle, at a high transmission efficiency. As such, the exhaustion of a battery attached to the main body of the power-assisted bicycle is decelerated, and thus the power-assisted bicycle can be used over a prolonged period of time with a single battery charge.

Moreover, since power can be wirelessly supplied to the load at a high transmission efficiency, a received power sufficient to operate the torque sensor can be obtained at the power receiving antenna even when a microwave having a high frequency is used and the power transmitting antenna and the power receiving antenna are at a distance from each other.

Since no directivity is required for radiation and reception of the microwave, both of the power transmitting antenna and the power receiving antenna can be configured as downsized antennas.

According to the sixth aspect of the present invention, the inverted-F antenna serving as the power transmitting antenna or the power receiving antenna, and the ground plane connected to the short circuit line of the inverted-F antenna can be formed in a step of providing printed wiring of the conductive pattern on the substrate surface of the power transmitting circuit board or the power receiving circuit board.

Moreover, since the inverted-F antenna serving as the power transmitting antenna or the power receiving antenna can be formed planarly along the substrate surface, the inverted-F antenna can be placed in a very small space surrounded by the electrically-conductive case.

According to the seventh aspect of the present invention, the inverted-F antenna, and the ground plane connected to the short circuit line of the inverted-F antenna can be efficiently formed on the one surface of the power receiving circuit board having a limited area, which is fixed around the axis of the crankshaft.

DESCRIPTION OF EMBODIMENTS

Figure 2:
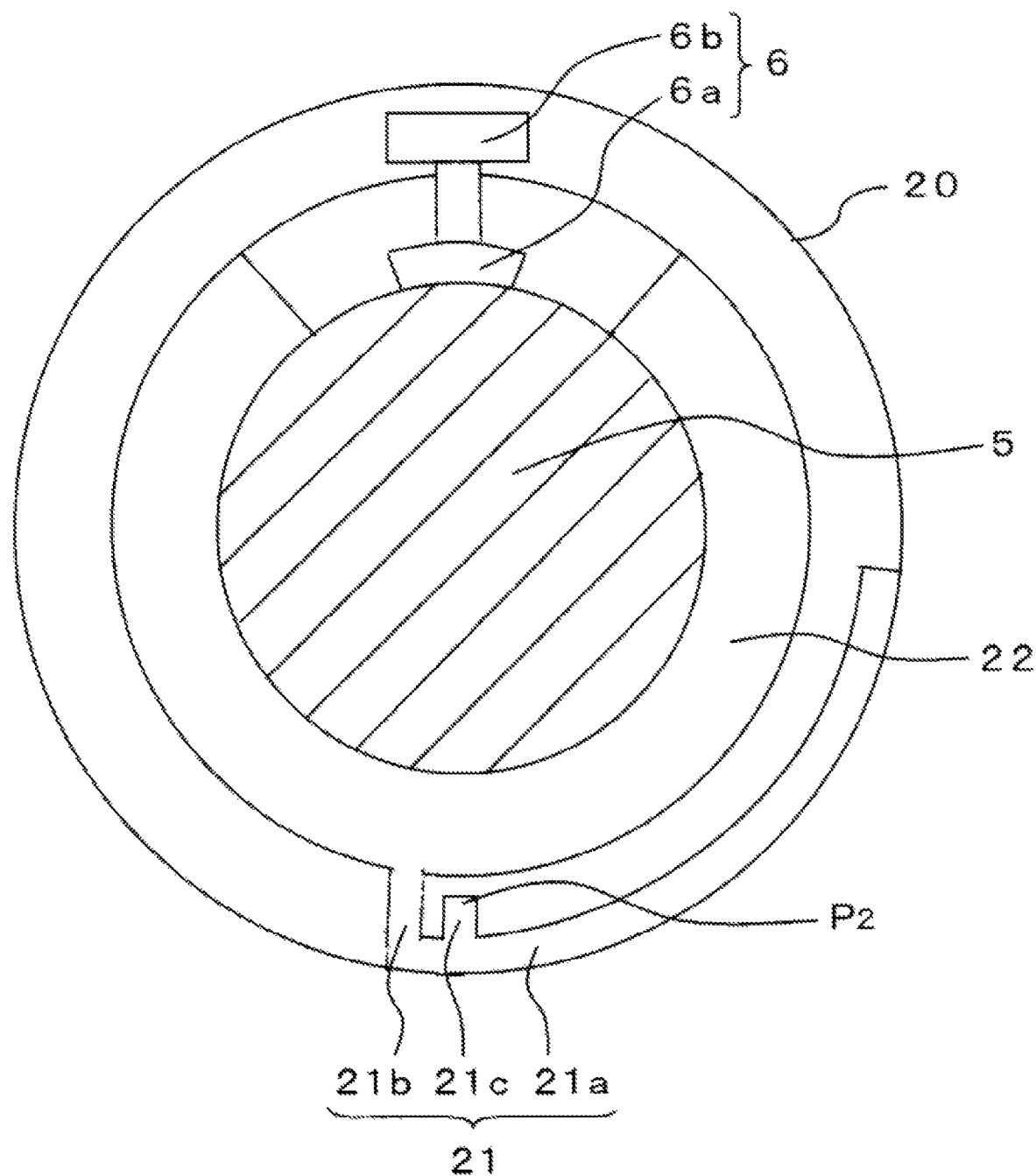
FIG. 2 is a partial cutaway plan view illustrating a disc-shaped power receiving circuit board 20.
Figure 3:
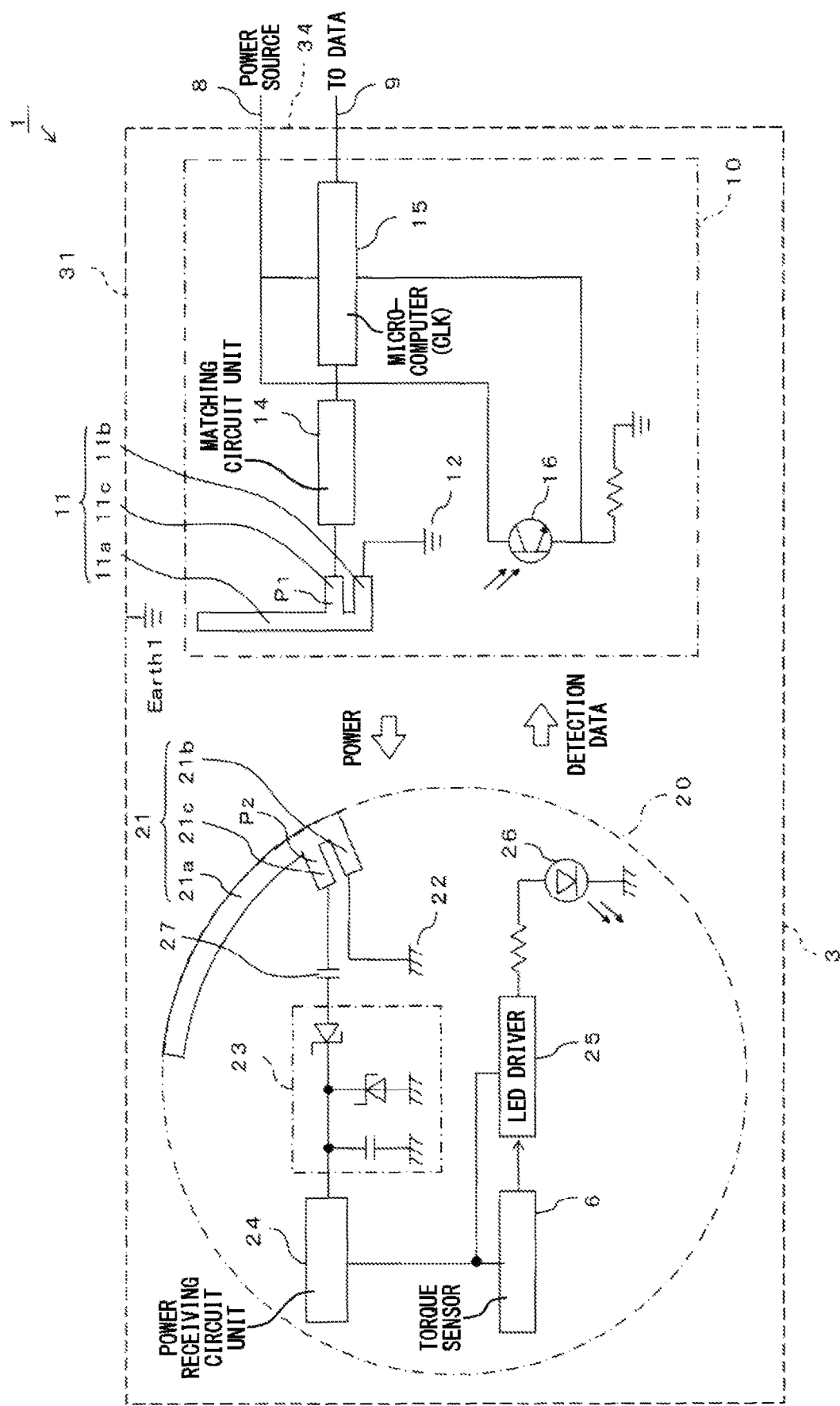
FIG. 3 is a block diagram illustrating a circuit configuration of the wireless power supply device 1.
Figure 4:
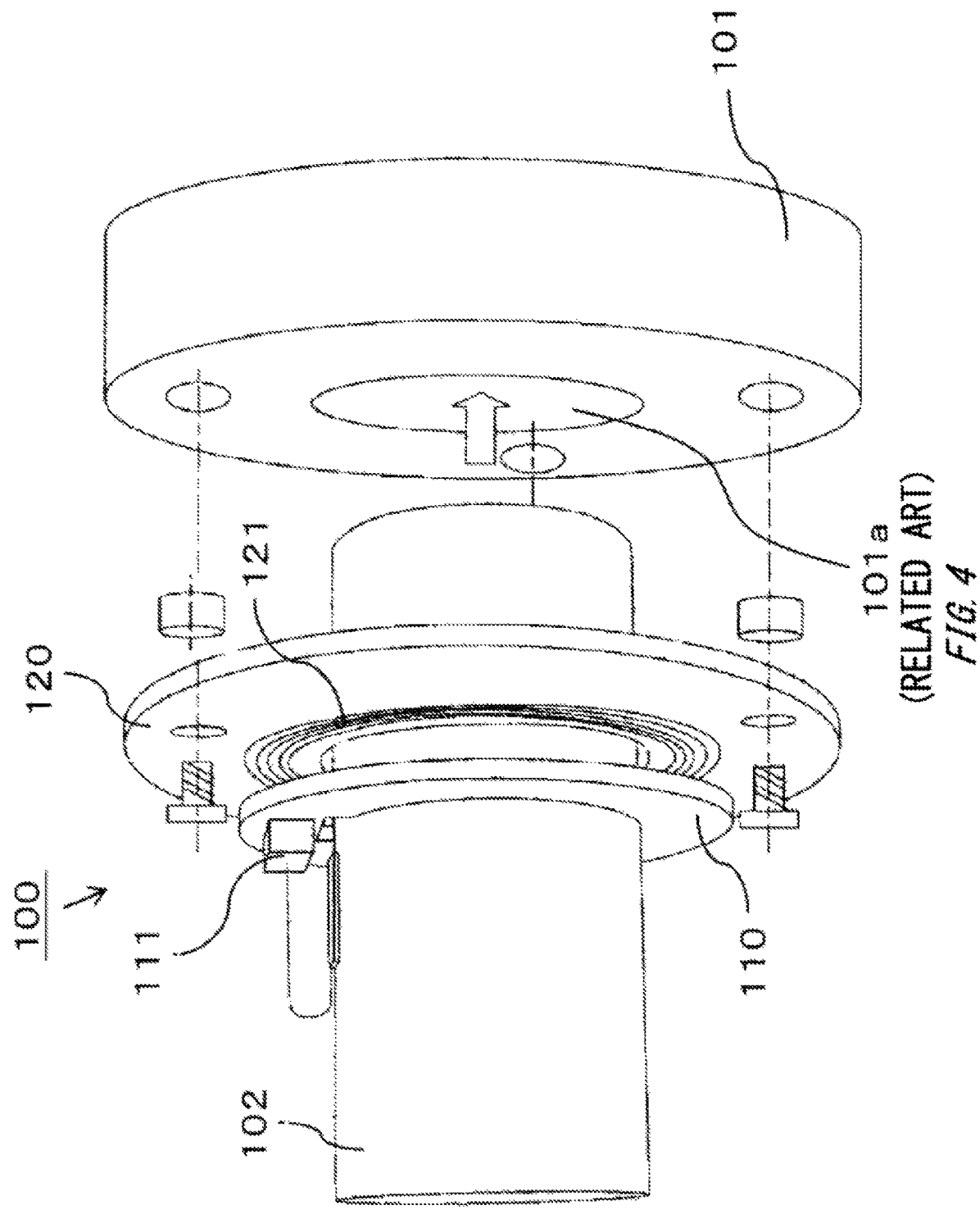
FIG. 4 is a perspective view illustrating a main part of a related wireless power supply device 100.
Figure 5:
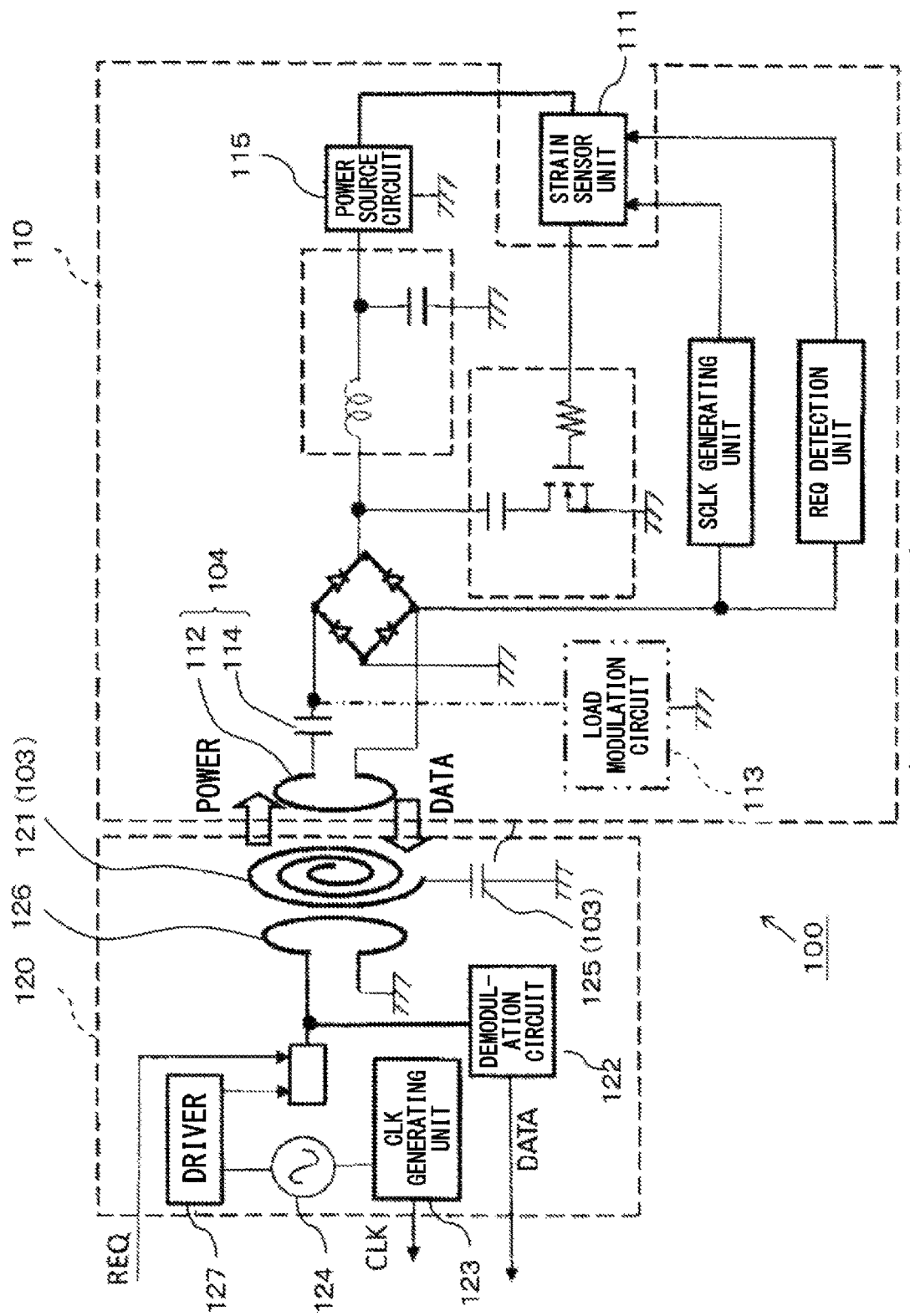
FIG. 5 is a block diagram illustrating a circuit configuration of the wireless power supply device 100.

A wireless power supply device 1 according to an embodiment of the present invention will now be described with reference to FIGS. 1 to 3. The wireless power supply device 1 according to the present embodiment is attached to a power-assisted bicycle to supply a driving power to a torque sensor 6 from a battery (not shown) attached to a frame body of the power-assisted bicycle. The torque sensor 6 is attached to a crankshaft 5, which rotates together with a pedal of the power-assisted bicycle, to detect a running torque of the crankshaft 5.

The crankshaft 5 is rotatably supported by being inserted through a bearing (not shown) provided in a bottom bracket 7 formed integrally with the frame body of the power-assisted bicycle. As shown in FIG. 1, an electrically-conductive case 3 is fixed along an outer side surface of the bottom bracket 7. The electrically-conductive case 3 is formed in the shape of a cylindrical box having its entire peripheral surface surrounded by an electrically-conductive metal plate 31. A lid surface (not shown) opposed to a bottom surface 3a of the box shape is pierced so as to have a through hole 32 for allowing the crankshaft 5 to be passed therethrough. One end of the crankshaft 5 projected from the bottom bracket 7 passes through the electrically-conductive case 3.

Figure 1:
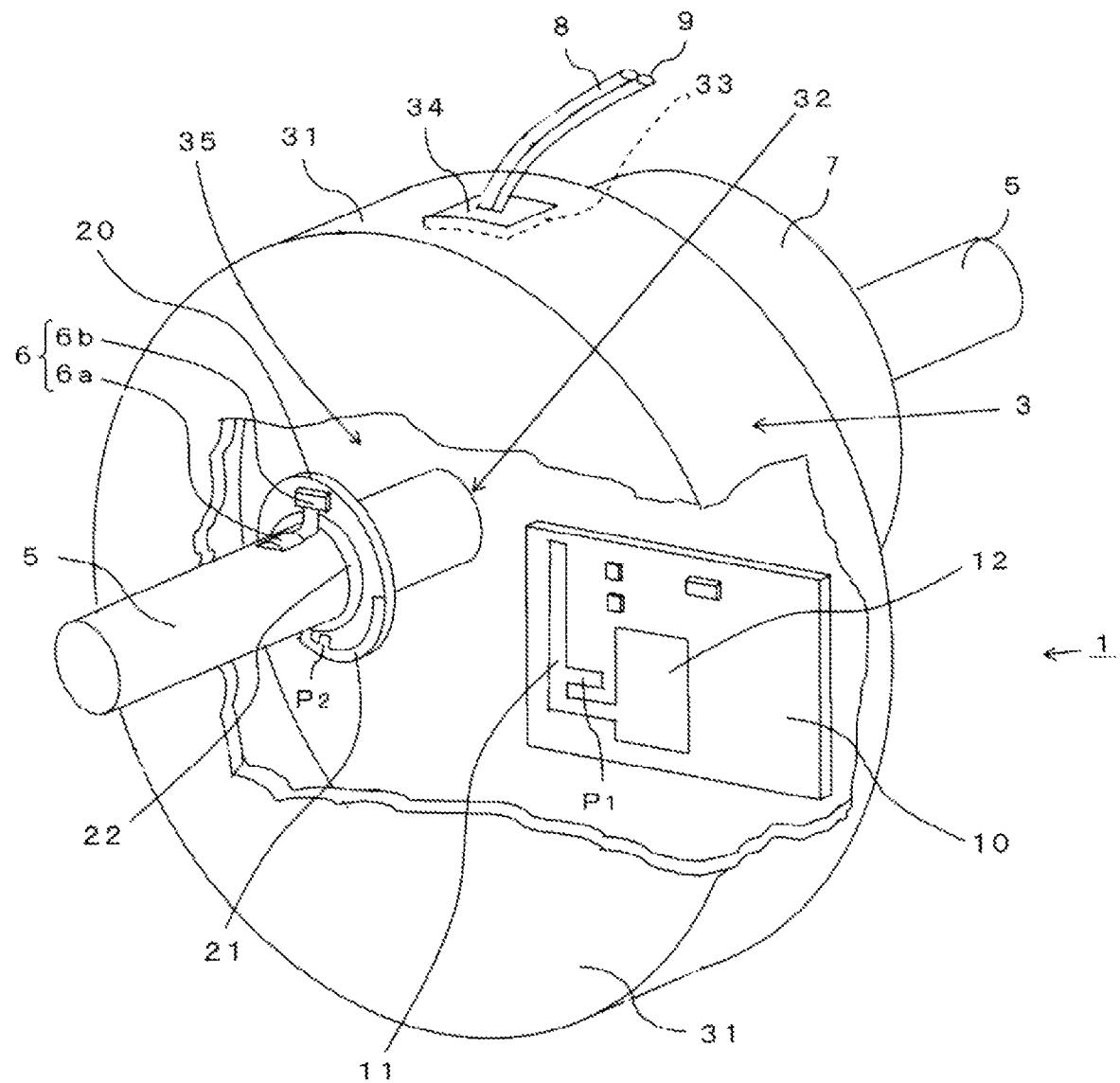
FIG. 1 is a partial cutaway perspective view illustrating a wireless power supply device 1 according to an embodiment of the present invention.

A portion of the upper part of the electrically-conductive case 3 in FIG. 1 is covered with an electrically-insulating synthetic resin plate 33. Inserted through the electrically-insulating synthetic resin plate 33 are a power cable 8 for providing a power source from the battery to circuit components mounted on a power transmitting circuit board 10 to be described later, and a signal cable 9 for outputting detection data of the torque sensor 6 to a drive control circuit (not shown) that controls the driving of an electric motor. In order to completely shield the interior of the electrically-conductive case 3, an electromagnetic shield film 34 electrically connected to the electrically-conductive metal plate 31 therearound is deposited over a surface of the electrically-insulating synthetic resin plate 33. Although the electrically-insulating synthetic resin plate 33 may be shielded by depositing an electromagnetic shield coating on the surface thereof, an aluminum-evaporated polyester film is used as the electromagnetic shield film 34 in the present embodiment.

As described above, the entire peripheral surface of the electrically-conductive case 3 is formed by the electrically-conductive metal plate 31 and the electromagnetic shield film 34. Inside the electrically-conductive case 3, the power transmitting circuit board 10 and a power receiving circuit board 20 are accommodated. On the power transmitting circuit board 10, a power transmitting antenna 11, a ground plane 12, a matching circuit unit 14, a microcomputer 15 equipped with a clock signal source, and a phototransistor 16 are formed. On the power receiving circuit board 20, a power receiving antenna 21, a ground plane 22, a power receiving capacitor 27, a full-wave rectifying circuit 23, a power receiving circuit unit 24, the torque sensor 6, an LED driver 25, and an infrared LED 26 to be photo-coupled with the phototransistor 16 are formed. Each circuit or circuit element being formed on a circuit board herein means that a circuit element constituting a circuit or a circuit element is mounted on a circuit board or formed by a conductive pattern on a circuit board.

The power transmitting circuit board 10 is attached to the electrically-conductive case 3 by electrically-conductive screws 4 passing through a grounded conductive pattern of the power transmitting circuit board 10. The grounded pattern formed on the power transmitting circuit board 10 and the ground plane 12 are ground-connected to each other via the electrically-conductive case 3 grounded at Earth 1.

The microcomputer 15, the matching circuit unit 14, and the phototransistor 16 formed on the power transmitting circuit board 10 are operated using the power source to which power is supplied by the battery via the power cable 8. The microcomputer 15 generates an AC voltage signal of a microwave having, in the present embodiment, a frequency of 2.4 GHz on the basis of a clock outputted from the clock signal source. The microcomputer 15 then outputs the generated AC voltage signal to the power transmitting antenna 11 via the matching circuit unit 14 that matches the output of the microcomputer 15 with the impedance of the power transmitting antenna 11.

The microcomputer 15 is also connected to the phototransistor 16 to demodulate the detection data of the torque sensor 6 from an infrared signal received by the phototransistor 16 and output the demodulated data to the drive control circuit disposed outside the electrically-conductive case 3 via the signal cable 9.

On the basis of a wavelength $\lambda$ of a 2.4 GHz microwave outputted from the matching circuit unit 14, the power transmitting antenna 11 is formed to have a length of $\lambda/2$ or $\lambda/4$, and radiates 2.4 GHz microwaves. The microwaves radiated from the power transmitting antenna 11 are received (power is received) by the power receiving antenna 21 formed to have a length of $\lambda/2$ or $\lambda/4$ in multipath reflected by an inner wall surface of the electrically-conductive case 3 at various positions. Thus, a non-directional antenna can be used for both of the power transmitting antenna 11 and the power receiving antenna 21. As such, inverted-F antennas each capable of downsizing using a length of $\lambda/4$ of the microwave and each capable of being formed in a two-dimensional plane by a conductive pattern provided on a substrate surface of the power transmitting circuit board 10 or the power receiving circuit board 20 are used for the power transmitting antenna 11 and the power receiving antenna 21 in the present embodiment.

Of these antennas, the inverted-F antenna 11, serving as a power transmitting antenna, is formed by an inverted-F conductive pattern when conductive patterns on the substrate surface of the power transmitting circuit board 10 are formed. As shown in FIG. 3, the inverted-F antenna 11 includes: an elongated main body part 11a; a short circuit line 11b connected to one end of the main body part 11a in the longitudinal direction thereof so as to be perpendicular to the main body part 11a; and a power supply line 11c connected to the main body part 11a so as to be perpendicular to a portion near the intersection of the main body part 11a and the short circuit line 11b and parallel to the short circuit line 11b. A length of adding the short circuit line 11b to the main body part 11a is about 31 mm corresponding to a length of $\lambda/4$ ($\lambda$ denotes the wavelength of a 2.4 GHz microwave), and the inverted-F antenna 11 can be formed on the substrate surface of the power transmitting circuit board 10 disposed inside the electrically-conductive case 3.

A tip $P_1$ of the power supply line 11c in the inverted-F antenna 11 is connected to the output of the matching circuit unit 14 to receive the microwave AC voltage signal outputted from the matching circuit unit 14. A tip of the short circuit line 11b is connected to the ground plane 12 having a rectangular shape, which is formed by a conductive pattern on the substrate surface of the power transmitting circuit board 10 near the inverted-F antenna 11, so as to allow the inverted-F antenna 11 with a length of $\lambda/4$ to function as a $\lambda/2$ antenna.

The inner diameter of the power receiving circuit board 20 is approximately equal to the outer diameter of the crankshaft 5. The power receiving circuit board 20 is formed in a disc shape perpendicular to the axial direction of the crankshaft 5, and attached around the axis of the crankshaft 5 inside the electrically-conductive case 3. The inverted-F antenna 21, serving as a power receiving antenna, is formed by an inverted-F conductive pattern along the circumferential direction of the disc-shaped power receiving circuit board 20 when conductive patterns are formed on the substrate surface of the power receiving circuit board 20. As shown in FIG. 2, the inverted-F antenna 21 includes: an arc-shaped main body part 21a provided along an outer circumferential edge of the disc-shaped power receiving circuit board 20; a short circuit line 21b connected to one end of the main body part 21a and formed toward the center of the arc; and a power supply line 21c connected to the main body part 21a in a normal direction toward the center of the arc-shaped main body part 21a in the vicinity of the portion at which the main body part 21a and the short circuit line 21b are connected to each other. As with the inverted-F antenna 11, a length of adding the short circuit line 21b to the main body part 21a is about 31 mm corresponding to a length of $\lambda/4$ ($\lambda$ denotes the wavelength of a 2.4 GHz microwave). The inverted-F antenna 21 can be formed on the substrate surface of the disc-shaped power receiving circuit board 20 attached around the axis of the crankshaft 5.

A tip $P_2$ of the power supply line 21c in the inverted-F antenna 21 is connected to the power receiving capacitor 27 to store the microwave AC voltage signal received by the inverted-F antenna 21. A tip of the short circuit line 21b is connected to the fan-shaped ground plane 22 formed by a conductive pattern provided along an inner circumferential edge of the disc-shaped power receiving circuit board so as to allow the inverted-F antenna 21 with a length of λ/4 to function as a λ/2 antenna.

The full-wave rectifying circuit 23 connected to the latter part of the power receiving capacitor 27 converts the output of the power receiving capacitor 27 having polarity inversion into a DC voltage power subjected to full-wave rectification, and outputs the power to the power receiving circuit unit 24. On the basis of the inputted power, the power receiving circuit unit 24 provides a DC power source to the torque sensor 6 and the LED driver 25 so as to operate these circuit components.

The torque sensor 6 detects a torque being applied to the crankshaft 5 on the basis of a shearing strain generated on a surface of the crankshaft 5. As shown in FIGS. 1 and 2, the torque sensor 6 includes: a strain sensor 6a fixed to the crankshaft 5; and an input and output unit 6b mounted on the substrate surface of the power receiving circuit board 20 for receiving power to operate the strain sensor 6a from the power receiving circuit unit 24 and outputting detection data of the strain sensor 6a to the LED driver 25.

The LED driver 25 controls the blinking of the infrared LED 26 on the basis of the detection data inputted from the torque sensor 6 so as to cause an infrared signal modulated by the detection data to be outputted from the infrared LED 26. As mentioned above, the phototransistor 16 and the infrared LED 26 are photo-coupled together so that the infrared signal emitted by the infrared LED 26 is received by the phototransistor 16. However, since the infrared light is reflected by the inner wall surface of the electrically-conductive case 3, the phototransistor 16 is not necessarily required to be disposed within a directivity angle of the infrared LED 26.

In the thus configured wireless power supply device 1, the circuit components, such as the microcomputer 15, the matching circuit unit 14, and the phototransistor 16, mounted on the power transmitting circuit board 10 fixed to the frame body of the power-assisted bicycle are supplied with the power source from the battery via the power cable 8, and 2.4 GHz microwaves are radiated from the power transmitting antenna 11.

Although the frequency of the microwaves radiated from the power transmitting antenna 11 and received by the power receiving antenna 21 is set to 2.4 GHz in the present embodiment, the frequency of such microwaves can be selected from a range of 300 MHz to several GHz as desired. The size of the power transmitting antenna 11 and the power receiving antenna 21, however, is determined by the wavelength of a microwave. It is therefore preferable to set the frequency to be larger than or equal to 800 MHz so that the wavelength λ becomes smaller than or equal to about 375 mm in order to allow the power transmitting antenna 11 and the power receiving antenna 21 to have a length capable of being formed on the power transmitting circuit board 10 and the power receiving circuit board 20 accommodated in the electrically-conductive case 3, respectively. Moreover, since power transmitted by microwaves decays with the square of the frequency of the microwaves, it is preferable to set the frequency of the microwaves to be smaller than or equal to 3 GHz in order to obtain power sufficient to operate the torque sensor 6 from the received microwaves in the power receiving antenna 21 spaced apart from the power transmitting antenna 11 by a distance of several centimeters.

As mentioned above, the microwaves radiated from the power transmitting antenna 11 into its surrounding space are reflected at various positions of the inner wall surface of the electrically-conductive case 3, and received (power is received) by the power receiving antenna 21 in multipath without escaping from the electrically-conductive case 3. As the result, the transmission power of the power transmitting antenna 11 can be received in the power receiving antenna 21 as a received power sufficient to operate the torque sensor 6 and other circuit components without the transmission power decaying with the square of the distance between the power transmitting antenna 11 and the power receiving antenna 21 and without the power transmitting antenna 11 radiating microwaves at an excessively large transmission power.

As just described, the power receiving antenna 21 formed on the power receiving circuit board 20, which rotates relative to the frame body of the power-assisted bicycle, can receive microwaves radiated from the power transmitting antenna 11, and wirelessly supply the received power of the microwaves to the circuit components, such as the torque sensor 6 and the LED driver 25, formed on the power receiving circuit board 20.

Thus, the torque sensor 6 operates using the received power received by the power receiving antenna 21 as a power source, detects a torque being applied to the crankshaft 5 on the basis of the shearing strain of the crankshaft 5, and outputs the detection data to the microcomputer 15 via the infrared signal outputted to the phototransistor 16 from the infrared LED 26. The drive control circuit connected to the microcomputer 15 via the signal cable 9 controls the driving of the electric motor in accordance with the detection data detected by the torque sensor 6.

According to the present embodiment, since the power transmitting antenna 11 and the power receiving antenna 21 are disposed inside the electrically-conductive case 3 surrounded by the electrically-conductive metal plate 31, power can be wirelessly supplied to the torque sensor 6 connected to the power receiving antenna 21 at a high transmission efficiency without the microwaves escaping from the electrically-conductive case 3. Moreover, the electrically-conductive case 3 that prevents the escaping of the microwaves therefrom may be a metal case that protects the loads such as the torque sensor 6 and the circuit components for wireless power supply from external forces.

Moreover, even when microwaves are radiated from the power transmitting antenna 11 at an excessively large transmission power in order to obtain, at the power receiving antenna 21, a received power sufficient to operate the torque sensor 6 and other circuit components, the human body riding on the power-assisted bicycle is subjected to no harmful effects since no microwaves radiated from the power transmitting antenna 11 escape from the electrically-conductive case 3.

Although a part of the electrically-conductive case 3 is formed by the electrically-insulating synthetic resin plate 33 in the above-described embodiment, the entire electrically-conductive case 3 may be formed by the electrically-conductive metal plate 31. The present invention is sufficiently applicable even when a part of the electrically-conductive case 3 is opened.

Although the inverted-F antennas are used as the power transmitting antenna 11 and the power receiving antenna 21, other antennas may be used as long as such antennas can be formed on the power transmitting circuit board 10 and the power receiving circuit board 20, and microwaves radiated from the power transmitting antenna 11 can be received by the power receiving antenna 21.

The inverted-F antennas used as the power transmitting antenna 11 and the power receiving antenna 21 employ the conductive patterns perpendicular to the one ends of the elongated main body parts 11a and 21a as the short circuit lines 11b and 21b and employ the conductive patterns connected to the main body parts 11a and 21a in the vicinity of the short circuit lines 11b and 21b as the power supply lines 11c and 21c. The inverted-F antennas, however, may employ the conductive patterns perpendicular to the one ends of the main body parts 11a and 21a as the power supply lines 11c and 21c and employ the conductive patterns connected to the main body parts 11a and 21a in the vicinity of the power supply lines 11c and 21c as the short circuit lines 11b and 21b.

The embodiment of the present invention is suitable for a wireless power supply device for supplying power to a load operating inside an electrically-conductive case covered with an electrically-conductive plate such as a metal plate.

REFERENCE SIGNS LIST 1 wireless power supply device
3 electrically-conductive case
6 torque sensor (load)
10 power transmitting circuit board
11 inverted-F antenna (power transmitting antenna)
12 ground plane
20 power receiving circuit board
21 inverted-F antenna (power receiving antenna)
22 ground plane

The invention claimed is:

1. A wireless power supply device comprising:
a power transmitting antenna;
a power supply circuit configured to supply a microwave to the power transmitting antenna;
a power receiving antenna;
a power receiving circuit configured to receive supply of power of the microwave via the power receiving antenna;
a load configured to operate using the power supplied by the power receiving circuit; and
an electrically-conductive case surrounded by an electrically-conductive plate in which the power transmitting antenna and the power receiving antenna are accommodated, wherein
in the electrically-conductive case, a microwave radiated from the power transmitting antenna is received by the power receiving antenna, and power of the microwave is supplied to the load from the power receiving circuit.

2. The wireless power supply device according to claim 1, wherein at least one of the power transmitting antenna and the power receiving antenna is configured as an inverted-F antenna including an elongated main body part, and a power supply line and a short circuit line connected to one side of the main body part in a longitudinal direction thereof so as to be perpendicular to the main body part.

3. The wireless power supply device according to claim 2, wherein the inverted-F antenna serving as the power transmitting antenna, and a ground plane connected to the power supply line of the inverted-F antenna are integrally formed by a conductive pattern provided on a substrate surface of a power transmitting circuit board.

4. The wireless power supply device according to claim 2, wherein the inverted-F antenna serving as the power receiving antenna, and a ground plane connected to the power supply line of the inverted-F antenna are integrally formed by a conductive pattern provided on a substrate surface of a power receiving circuit board.

5. A wireless power supply device comprising:
a power transmitting circuit board on which a power transmitting antenna is formed;
a power supply circuit configured to supply a microwave to the power transmitting antenna;
a power receiving circuit board on which a power receiving antenna is formed;
a power receiving circuit configured to receive supply of power of the microwave via the power receiving antenna;
a load configured to operate using the power supplied by the power receiving circuit; and
an electrically-conductive case surrounded by an electrically-conductive plate in which the power transmitting antenna and the power receiving antenna are accommodated, wherein
in the electrically-conductive case, a microwave radiated from the power transmitting antenna is received by the power receiving antenna, and power of the microwave is supplied to the load,
the load is a torque sensor configured to detect a running torque of a crankshaft that rotates together with a pedal of a power-assisted bicycle,
the torque sensor and the power receiving circuit board are fixed to the crankshaft, and
the power transmitting circuit board on which the power transmitting antenna is formed and the power receiving circuit board on which the power receiving antenna is formed are accommodated in the electrically-conductive case fixed to a main body of the power-assisted bicycle.

6. The wireless power supply device according to claim 5, wherein
at least one of the power transmitting antenna and the power receiving antenna is configured as an inverted-F antenna including an elongated main body part, and a power supply line and a short circuit line connected to one side of the main body part in a longitudinal direction thereof so as to be perpendicular to the main body part, and
the inverted-F antenna and a ground plane connected to the short circuit line of the inverted-F antenna are integrally formed by a conductive pattern provided along a substrate surface of any of the power transmitting circuit board and the power receiving circuit board.

7. The wireless power supply device according to claim 6, wherein the power receiving circuit board is formed in a disc shape to be fixed around an axis of the crankshaft,
the main body part of the inverted-F antenna serving as the power receiving antenna is formed by an arc-shaped conductive pattern provided along an outer circumferential edge of the disc-shaped power receiving circuit board, and
the ground plane connected to the short circuit line of the inverted-F antenna serving as the power receiving antenna is formed by a fan-shaped conductive pattern provided along an inner circumferential edge of the disc-shaped power receiving circuit board.

* * * * *